(12) United States Patent
Huang et al.

(10) Patent No.: US 11,337,068 B1
(45) Date of Patent: May 17, 2022

(54) MULTI-LINK DEVICE AND METHOD PERFORMED THEREIN

(71) Applicant: Intel Corporation, Santa Clara, CA (US)

(72) Inventors: Po-Kai Huang, San Jose, CA (US); Ido Ouzieli, Tel Aviv (IL); Danny Alexander, Neve Efraim Monoson (IL); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/098,504

(22) Filed: Nov. 16, 2020

(51) Int. Cl.
| | |
|---|---|
| H04L 29/06 | (2006.01) |
| H04W 12/08 | (2021.01) |
| H04W 12/037 | (2021.01) |
| H04W 12/062 | (2021.01) |
| H04W 84/12 | (2009.01) |

(52) U.S. Cl.
CPC ......... *H04W 12/08* (2013.01); *H04W 12/037* (2021.01); *H04W 12/062* (2021.01); *H04W 84/12* (2013.01)

(58) Field of Classification Search
None
See application file for complete search history.

(56) References Cited

U.S. PATENT DOCUMENTS

| | | | |
|---|---|---|---|
| 2018/0206174 A1* | 7/2018 | Zhou | H04L 45/245 |
| 2020/0221545 A1* | 7/2020 | Stacey | H04W 72/0453 |
| 2020/0267541 A1* | 8/2020 | Huang | H04W 12/10 |
| 2020/0359259 A1* | 11/2020 | Patil | H04W 76/15 |
| 2021/0100050 A1* | 4/2021 | Ho | H04W 76/15 |

(Continued)

OTHER PUBLICATIONS

Adams, Mark; Bhargava, Vijay K. Using friendly jamming to improve route security and quality in ad hoc networks. 2017 IEEE 30th Canadian Conference on Electrical and Computer Engineering (CCECE). https://ieeexplore.ieee.org/stamp/stamp.jsp?tp=&arnumber=7946684 (Year: 2017).*

(Continued)

*Primary Examiner* — Jeremiah L Avery
(74) *Attorney, Agent, or Firm* — Law Offices of Liaoteng Wang

(57) ABSTRACT

The application relates to a multi-link device and a method performed therein. An access point multi-link device (AP MLD) includes a plurality of APs, each of which comprises: a wireless medium; and processor circuitry coupled to the wireless medium and configured to: transmit security capability indication information via the wireless medium; receive an association request frame from a non-AP MLD via the wireless medium, wherein the association request frame comprises security capability indication information of the plurality of non-AP STAs; determine whether the security capability indication information of any of the plurality of non-AP STAs matches with the security capability indication information of the AP; and if the security capability indication information of one of the plurality of non-AP STAs matches with the security capability information of the AP, transmit an association response frame to the non-AP MLD via the wireless medium.

25 Claims, 12 Drawing Sheets

(56) References Cited

U.S. PATENT DOCUMENTS

2021/0100051 A1\* 4/2021 Ho .................. H04L 63/0428
2021/0126947 A1\* 4/2021 Wang ............... H04W 12/0433

OTHER PUBLICATIONS

Tiomela, Boris et al. Architecture Options for Satellite Integration into 5G Networks. 2018 European Conference on Networks and Communications (EuCNC). https://ieeexplore.ieee.org/stamp/stamp.jsp?tp=&arnumber=8442436 (Year: 2018).\*

Eletreby, Rashad et al. Supporting PHY-Layer Security in Multi-Link Wireless Networks Using Friendly Jamming. 2015 IEEE Global Communications Conference (GLOBECOM). https://ieeexplore.ieee.org/stamp/stamp.jsp?tp=&arnumber=7417141 (Year: 2015).\*

\* cited by examiner

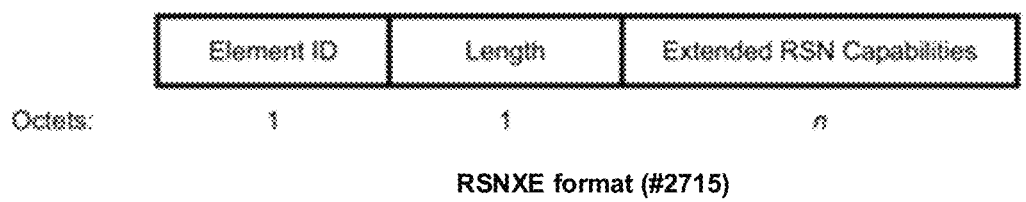

RSNXE format (#2715)

FIG. 5A

Extended RSN Capabilities field (#2715)

| Bit | Information | Notes |
|---|---|---|
| 0-3 | Field length | The length of the Extended RSN Capabilities field, in octets, minus 1, i.e., n - 1. |
| 4 | Protected TWT Operations Support | The STA sets the Protected TWT Operations Support field to 1 when dot11ProtectedTWTOperationsImplemented is true, and sets it to 0 otherwise. See 10.47.1 (TWT overview). |
| 5(M137) | SAE hash-to-element | The AP supports directly hashing to obtain the PWE instead of looping. See 12.4.4.2.3 (Hash-to-curve generation of the password element with ECC groups(M137)) and 12.4.4.3.3 (Direct Generation of the password element with FFC groups(M137)). |
| (M137)6-(8×n - 1) | Reserved | |

FIG. 5B

MULTI-LINK DEVICE AND METHOD PERFORMED THEREIN

TECHNICAL FIELD

Embodiments of the disclosure generally relate to wireless communications, and in particular, to an access point multi-link device and a method performed therein and a non-access point multi-link device and a method performed therein.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

An Extremely High Throughput (EHT) network, also known as 802.11be network, achieves high throughput through a series of system features and various mechanisms. A multi-link device (MLD) is an 802.11be device with more than one stations (STAs), which has one Media Access Control (MAC) interface and primitives to Logic Link Control (LLC) and a single MAC address associated with the MAC interface. MLDs may be classified as Access point (AP) MLDs and non-AP MLDs. Each STA within an AP MLD is an AP having its own wireless medium and each STA within a non-AP MLD is a Non-AP STA having its own wireless medium.

SUMMARY

An aspect of the disclosure provides an access point multi-link device (AP MLD) comprising a plurality of Access Points (APs), each of which comprises: a wireless medium; and processor circuitry coupled to the wireless medium and configured to: transmit security capability indication information via the wireless medium; receive an association request frame from a non-AP MLD, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs; determine whether the security capability indication information of any of the plurality of non-AP STAs matches with the security capability indication information of the AP; and if the security capability indication information of one of the plurality of non-AP STAs matches with the security capability information of the AP, transmit an association response frame to the non-AP MLD via the wireless medium, wherein the security capability indication information transmitted by the AP comprises MLD-level capability indication information common to the plurality of APs and link-level capability indication information corresponding to the AP or respective ones of the plurality of APs.

An aspect of the disclosure provides a non-access point multi-link device (non-AP MLD) comprising a plurality of stations (non-AP STAs), each of which comprises: a wireless medium; and processor circuitry coupled to the wireless medium and configured to: transmit an association request frame to an AP MLD via the wireless medium, wherein the AP MLD comprises a plurality of Access Points (APs), the association request frame is transmitted by the non-AP MLD based on security capability indication information from the plurality of APs and comprises security capability indication information of the non-AP MLD, and the security capability indication information of the non-AP MLD comprises MLD-level capability indication information common to the plurality of STAs and link-level capability indication information corresponding to respective ones of the plurality of STAs; and receive an association response frame from the AP MLD via the wireless medium, wherein the association response frame is transmitted by the AP MLD if the security capability indication information of the non-AP STA matches with the security capability information of one of the plurality of APs.

An aspect of the disclosure provides a method performed in an access point multi-link device (AP MLD), wherein the AP MLD comprises a plurality of Access Points (APs) and the method is performed by each of the plurality of APs, the method comprising: transmitting security capability indication information via a wireless medium; receiving an association request frame from a non-AP MLD, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs; determining whether the security capability indication information of any of the plurality of non-AP STAs matches with the security capability indication information of the AP; and if the security capability indication information of one of the plurality of non-AP STAs matches with the security capability information of the AP, transmitting an association response frame to the non-AP MLD via the wireless medium, wherein the security capability indication information transmitted by the AP comprises MLD-level capability indication information common to the plurality of APs and link-level capability indication information corresponding to the AP or respective ones of the plurality of APs.

An aspect of the disclosure provides a method performed in a non-access point multi-link device (non-AP MLD), wherein the non-AP MLD comprises a plurality of non-AP stations (non-AP STAs) and the method is performed by each of the plurality of non-AP STAs, the method comprising: transmitting an association request frame to an AP MLD via a wireless medium, wherein the AP MLD comprises a plurality of APs, the association request frame is transmitted by the non-AP MLD based on security capability indication information from the plurality of APs and comprises security capability indication information of the non-AP MLD, and the security capability indication information of the non-AP MLD comprises MLD-level capability indication information common to the plurality of non-AP STAs and link-level capability indication information corresponding to respective ones of the plurality of non-AP STAs; and receiving an association response frame from the AP MLD via the wireless medium, wherein the association response frame is transmitted by the AP MLD if the security capability indication information of the non-AP STA matches with the security capability information of one of the plurality of APs.

BRIEF DESCRIPTION OF THE DRAWINGS

Embodiments of the disclosure will be illustrated, by way of example and not limitation, in the figures of the accompanying drawings in which like reference numerals refer to similar elements.

FIGS. 5A and 5B are tables showing RSNXE format and a description of Extended RSN Capabilities field.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
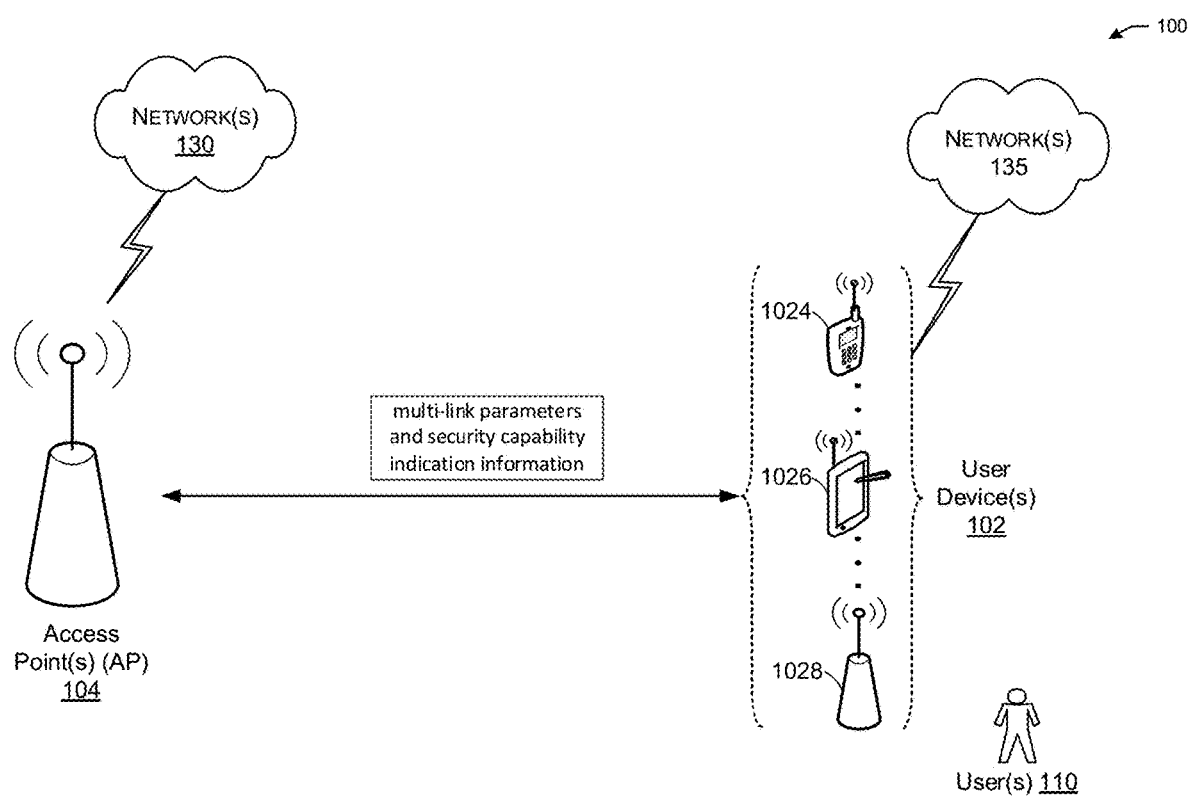
FIG. 1 is a network diagram illustrating an example network environment according to some example embodiments of the disclosure.

FIG. 1 is a network diagram illustrating an example network environment according to some example embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 7:
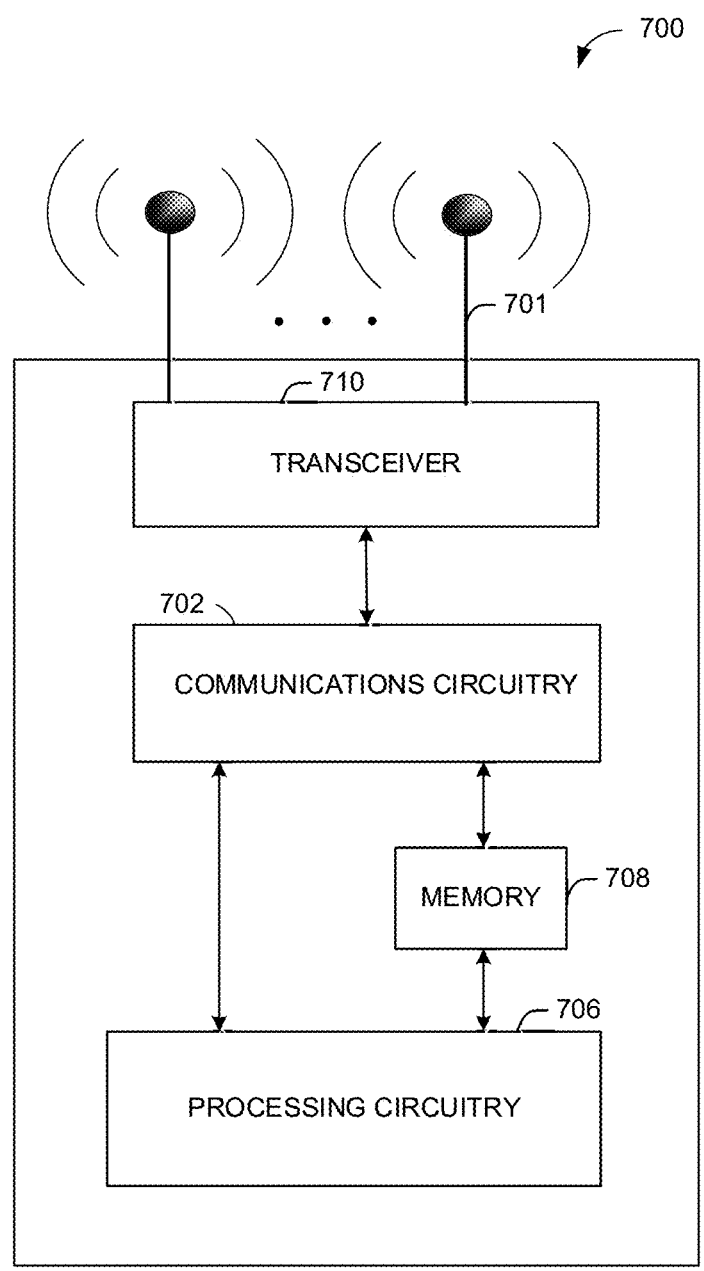
FIG. 7 shows a functional diagram of an exemplary communication station 700, in accordance with one or more example embodiments of the disclosure.
Figure 8:
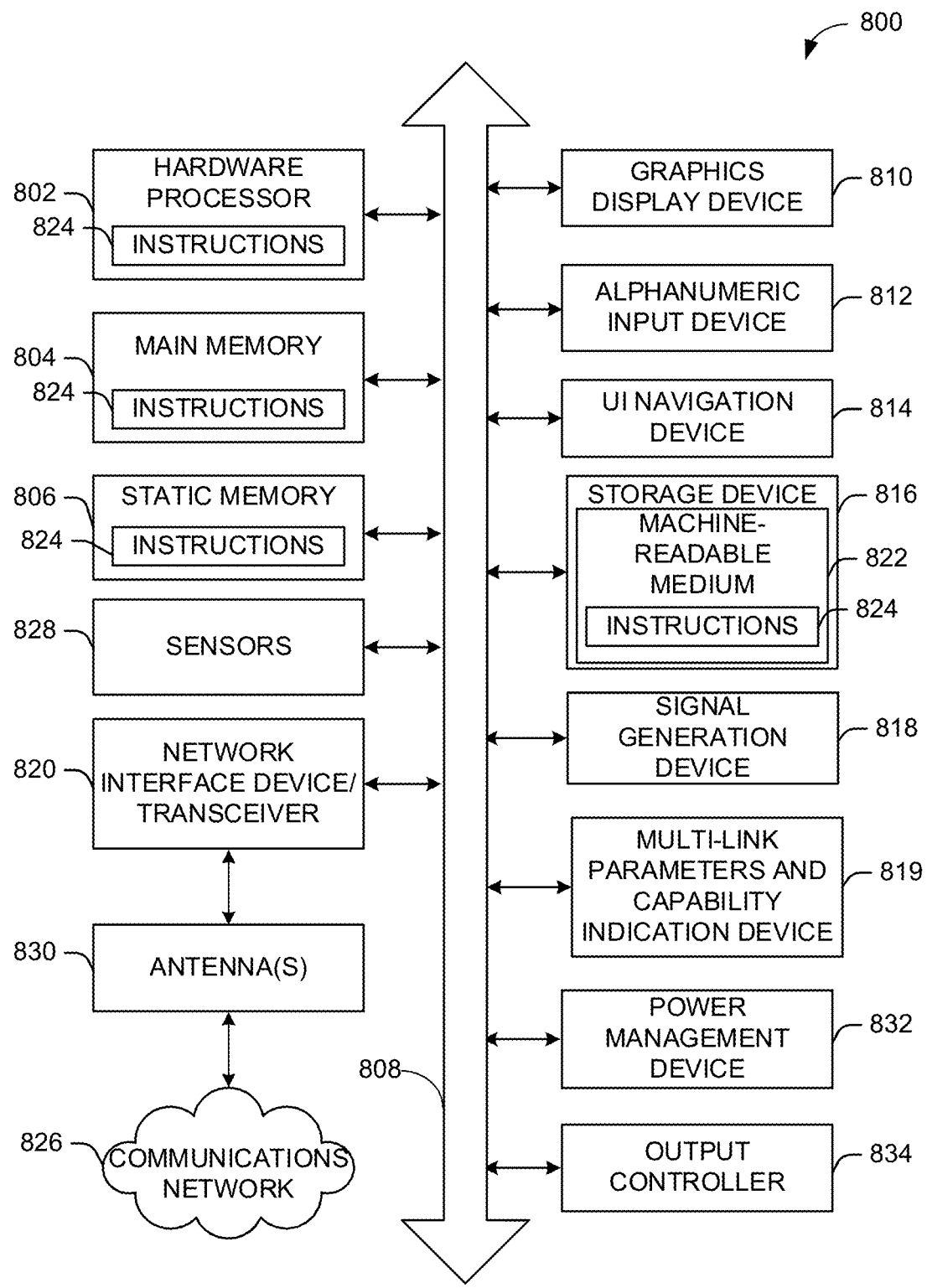
FIG. 8 illustrates a block diagram of an example of a machine or system 800 upon which any one or more of the techniques (e.g., methodologies) discussed herein may be performed.

In some embodiments, the user devices 102 and APs 104 may include one or more function modules similar to those in the functional diagram of FIG. 7 and/or the example machine/system of FIG. 8.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, with reference to FIG. 1, any of the user devices 102 may be implemented a non-AP MLD, and any of APs 104 may be implemented as an AP MLD. The AP MLD may exchange multi-link parameters and security capability indication information with the non-AP MLD. It should be understood that the above descriptions are for purposes of illustration and are not meant to be limiting.

Figure 2:
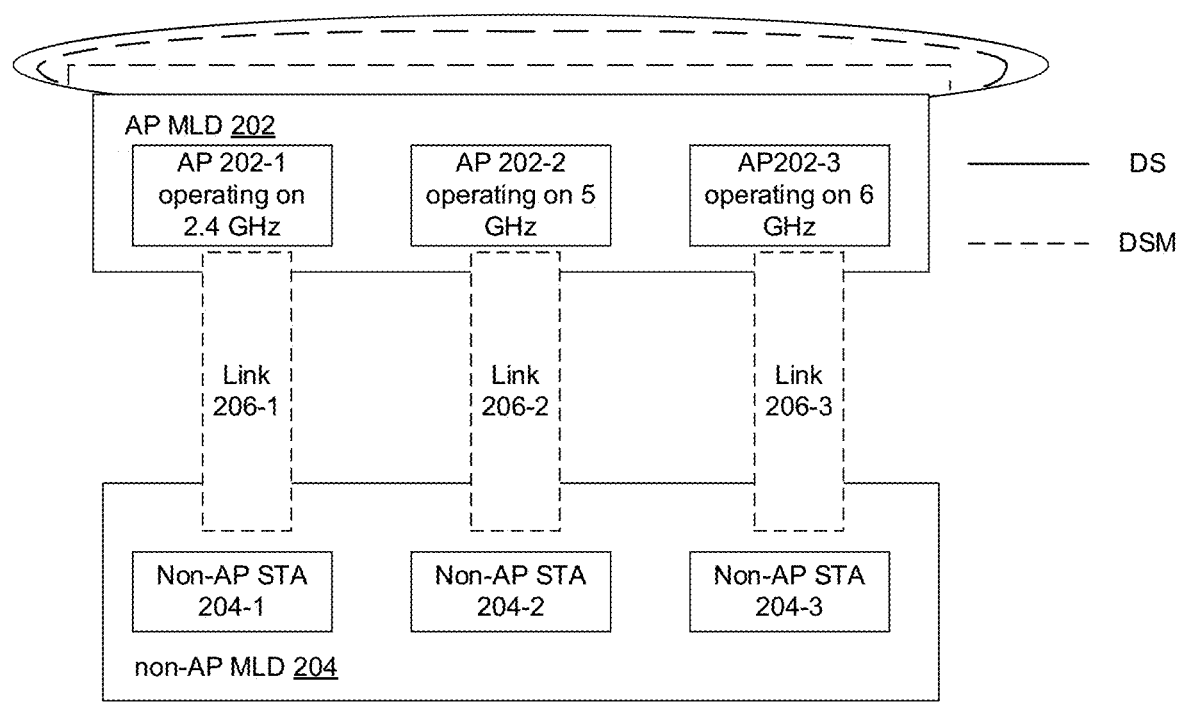
FIG. 2 is a schematic diagram showing an infrastructure framework in which an AP MLD communicates with a non-AP MLD.

FIG. 2 is a schematic diagram showing an infrastructure framework in which an AP MLD communicates with a non-AP MLD. As shown in FIG. 2, AP MLD 202 includes APs 202-1 to 202-3 operating on 2.4 GHz, 5 GHz, and 6 GHz, respectively. Non-AP MLD 204 includes non-AP STAs 204-1 to 204-3. There is a link 206-1 between AP 202-1 and non-AP STA 204-1, there is a link 206-2 between AP 202-2 and non-AP STA 204-2, and there is a link 206-3 between AP 202-3 and non-AP STA 204-3. AP MLD 202 may communicate with non-AP MLD 204 on any of the links 206-1 to 206-3. For example, AP MLD 202 may communicate with non-AP MLD 204 just on the link 206-1 (that is, AP 202-1 communicates with non-AP STA 204-1). As another example, AP MLD 202 may communicate with non-AP MLD 204 on the link 206-2 (that is, AP 204-2 communicates with non-AP STA 206-2) and the link 206-3 (that is, AP 204-3 communicates with non-AP STA 206-3), simultaneously. Furthermore, as shown in FIG. 2, the solid line refers to a distribution system (DS) and the dotted line refers to a distribution system medium (DSM). AP MLD 202 may communicate with another AP MLD on the DSM.

Figure 3:
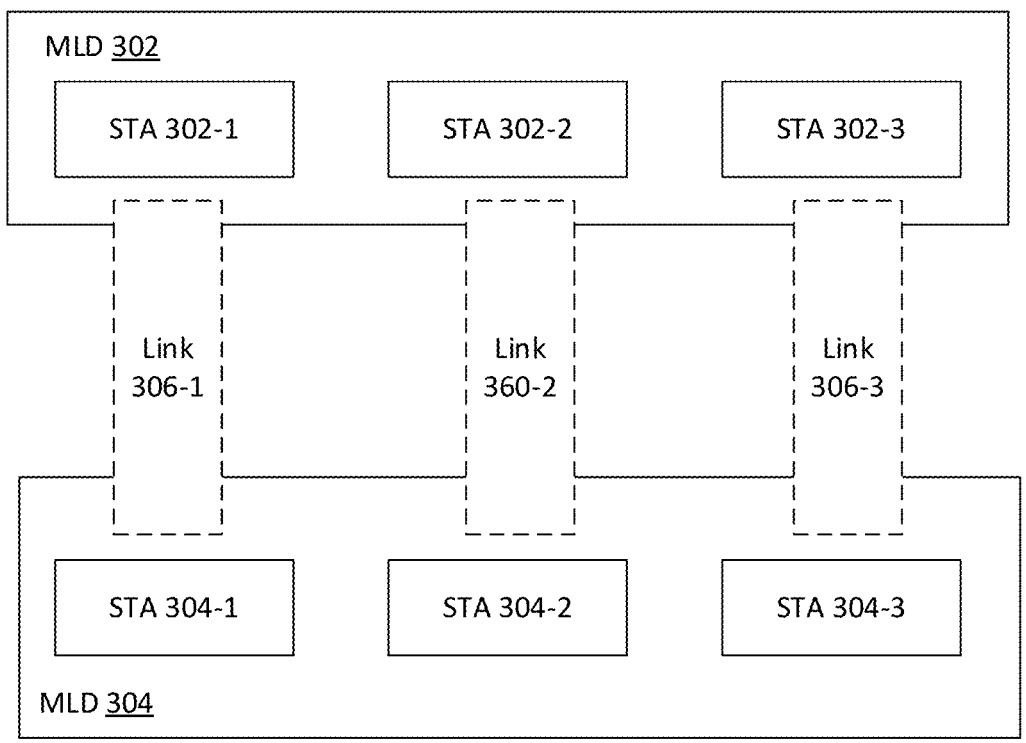
FIG. 3 is a schematic diagram showing an infrastructure framework in which two peer MLDs communicate with each other.

FIG. 3 is a schematic diagram showing an infrastructure framework in which two peer MLDs communicate with each other. As shown in FIG. 3, MLD 302 includes STAs 302-1 to 302-3, and MLD 304 includes STAs 304-1 to 304-3. There is a link 306-1 between STA 302-1 and STA 304-1, there is a link 306-2 between STA 302-2 and STA 304-2, and there is a link 306-3 between STA 302-3 and STA 304-3. MLD 302 may communicate with MLD 304 on any of the links 306-1 to 306-3. For example, MLD 302 may communicate with MLD 304 just on the link 306-1 (that is, STA 302-1 communicates with STA 304-1). As another example, MLD 302 may communicate with MLD 304 on the link 306-2 (that is, STA 304-2 communicates with STA 306-2) and the link 306-3 (that is, STA 304-3 communicates with STA 306-3), simultaneously. It should be appreciated that MLD 302 and MLD 304 may be two AP MLDs or two non-AP MLDs.

When an AP MLD communicates with a non-AP MLD, the AP MLD may exchange security capability indication information with the non-AP MLD. Usually, some security capabilities of an AP/non-AP STA within the AP MLD/non-AP MLD may affect security performance of the whole of the AP MLD/non-AP MLD, and some security capabilities of the AP/non-AP STA within the AP/MLD/non-AP STA may affect only security performance of the AP/non-AP STA itself.

In some embodiments, security capabilities of each AP/non-AP STA in an AP MLD/non-AP MLD may be classified as MLD-level security capabilities (that is, security capabilities affecting security performance of the whole of the AP MLD/non-AP MLD) and link-level security capabilities (that is, security capabilities affecting security performance of the AP/non-AP STA). Each AP/non-AP STA within the AP MLD/non-AP MLD may indicate its MLD-level security capabilities through MLD-level capability indication information and indicate its link-level security capabilities through link-level capability indication information. Therefore, security capability indication information of each AP/non-AP STA within the AP MLD/non-AP MLD may include the MLD-level capability indication information and the link-level capability indication information.

Figure 4A:
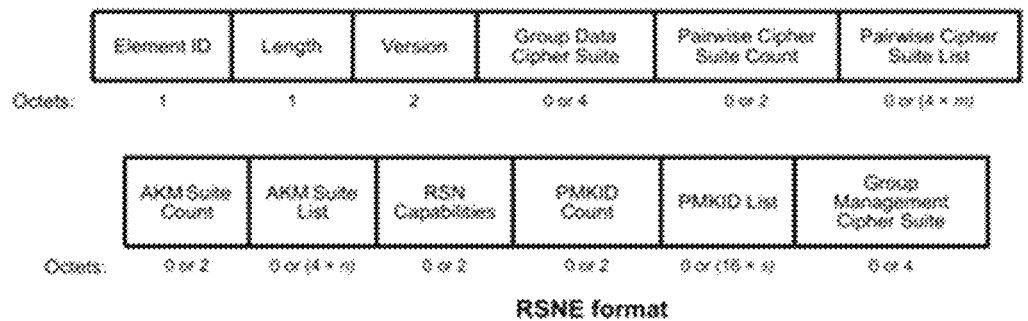
FIGS. 4A and 4B are tables showing RSNE format and RSN Capabilities field format.
Figure 4B:
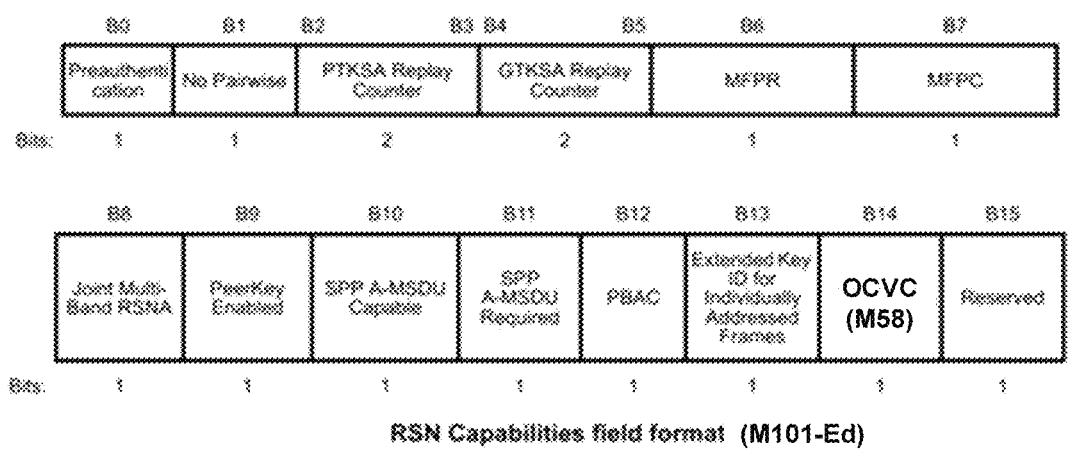

In some embodiments, each AP/non-AP STA within the AP MLD/non-AP MLD may transmit the MLD-level capability indication information and the link-level capability indication information by one Robust Security Network Element (RSNE) and one RSN extended Element (RSNEX). FIGS. 4A and 4B are tables showing RSNE format and RSN Capabilities field format. FIGS. 5A and 5B are tables showing RSNXE format and a description of Extended RSN Capabilities field. In this case, the security capabilities of the AP/non-AP STA within the AP MLD/non-AP MLD may be indicated by capability fields in the RSNE and RSNXE. In other words, each capability field in the RSNE/RSNXE indicates a corresponding security capability of an AP/non-AP STA.

To support legacy non-AP STAs, each AP within the AP MLD will transmit its own RSNE and RSNXE in beacons and a probe response frame. If different APs within the AP MLD indicate different MLD-level security capabilities in their RSNEs and RSNXEs, it is ambiguous on what MLD-level security capabilities the AP MLD will support.

For example, when the AP MLD and the non-AP MLD have decided to share one authentication, a single Pairwise Transient Key (PTK) across links, and a single BA agreement for each TID across links, it does not make sense whether the following security capabilities of the APs within the AP MLD are different or not.

Preauthentication
PTKSA replay counter
MFPR, MPFC
SPP A-MSDU capable, SPP A-MSDU Required
PBAC
Extended Key ID for individually addressed frames
SAE-hash-to-element
Protected TWT Operations Support
Pairwise cipher suite, AKM suite It is desirable to propose a solution to indicate the security capabilities of the AP MLD to avoid inter-operation issues between the AP MLD and the non-AP MLD.

Figure 6:
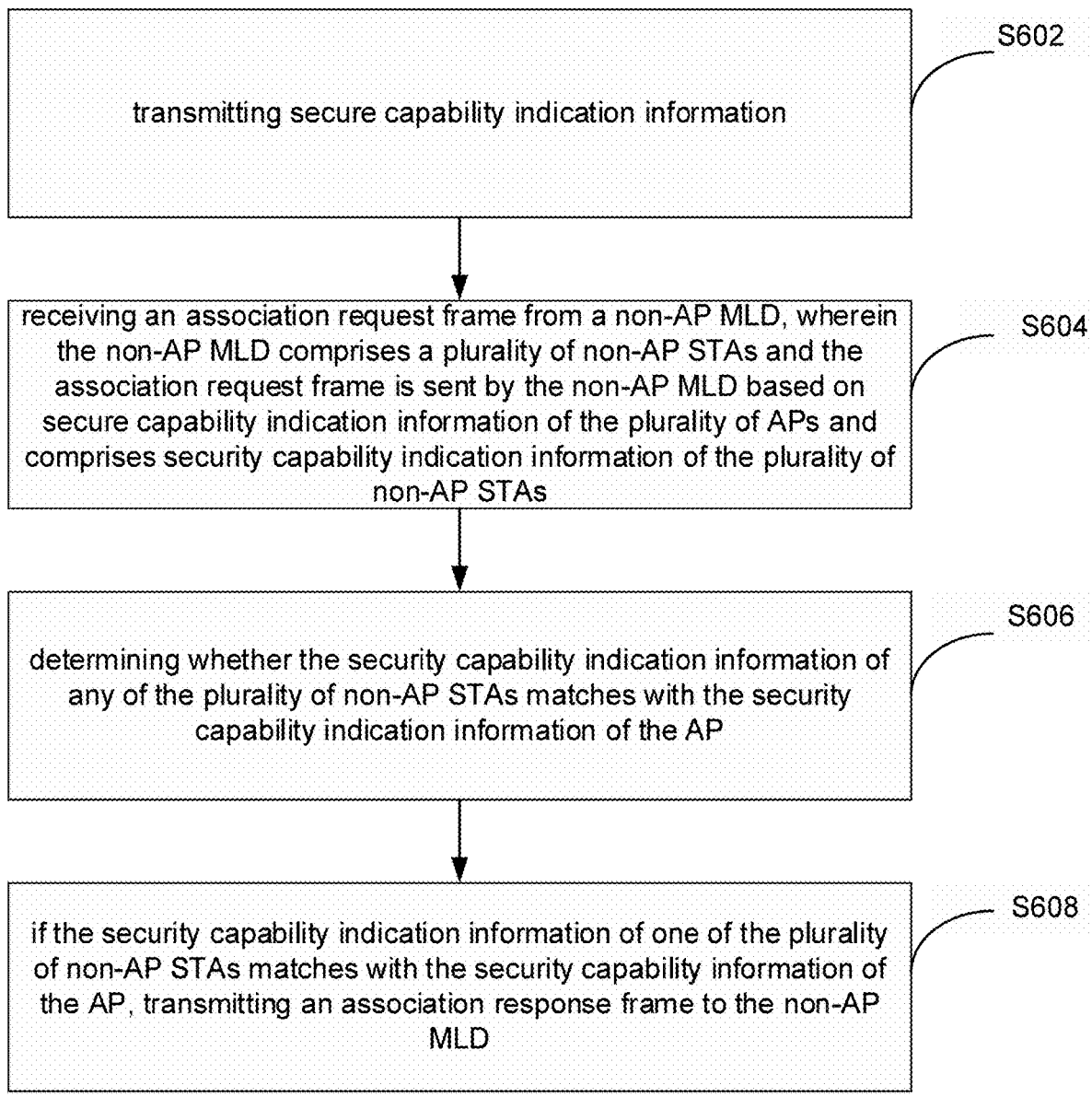
FIG. 6 is a flowchart showing a method 600 performed by each AP within an AP MLD including a plurality of APs.

FIG. 6 is a flowchart showing a method 600 performed by each AP within an AP MLD including a plurality of APs, each of which includes a wireless medium and processor circuitry coupled to the wireless medium. As shown in FIG. 6, the method 600 includes the following steps: S602, transmitting security capability indication information via the wireless medium; S604, receiving an association request frame from a non-AP MLD via the wireless medium, wherein the non-AP MLD comprises a plurality of non-AP STAs and the association request frame is transmitted by the non-AP MLD based on security capability indication information from the plurality of APs and includes security capability indication information of the plurality of non-AP STAs; S606, determining whether the security capability indication information of any of the plurality of non-AP STAs matches with the security capability indication information of the AP; and S608, if the security capability indication information of one of the plurality of non-AP STAs matches with the security capability information of the AP, transmitting an association response frame to the non-AP MLD via the wireless medium. The security capability indication information transmitted by the AP may include MLD-level capability indication information common to the plurality of APs and link-level capability indication information corresponding to the AP.

There are three options to indicate security capabilities of the AP MLD.

Option 1

In some embodiments, to support legacy non-AP STAs, each AP within the AP MLD may be configured to transmit its own RSNE and RSNXT.

Option 1.1

In some embodiments, all the APs within the AP MLD may be configured to support the same MLD-level security capabilities and the same link-level security capabilities. At this time, the MLD-level capability indication information may be the same for all the APs within the AP MLD, and the link-level capability indication information may also be the same for all APs within the AP MLD. Therefore, the capability fields of the RSNE and the RSNXE transmitted by any AP within the AP MLD may indicate the same security capabilities as those of the RSNEs and RSNXEs transmitted by other APs within the AP MLD. In this case, the capability fields of the RSNE and the RSNXE transmitted by any AP within the AP MLD will indicate not only its own security capabilities but also the security capabilities of the AP MLD.

In other words, under this option, the security capability indication information sent by any AP within the AP MLD comprises the MLD-level capability indication information common to the APs within the AP MLD and the link-level capability indication information common to the APs within the AP MLD. That is, both the MLD-level capability indication information and the link-level capability indication information of the APs within the AP MLD are the same.

Option 1.2

In some embodiments, the APs within the AP MLD may be configured to support the same or different MLD-level security capabilities and/or the same or different link-level security capabilities according to actual situations. In this case, if the MLD-level capability indication information sent by all the plurality of APs within the AP MLD indicates that a security capability is supported, the security capability is supported by the AP MLD For example, if some APs within the AP MLD are configured to support SPP A-MSDU and PBAC and the other APs within the AP MLD are configured to not support SPP A-MSDU but support PBAC, then it is determined that the AP MLD does not support SPP A-MSDU and support PBAC.

In some embodiments, the MLD-level capability indication information may include one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

In some embodiments, in the MLD-level capability indication information transmitted by any AP within the AP MLD, there may be one or more Pairwise Cipher Suites, which are common to the APs within the AP MLD, for the non-AP MLD to choose, and there may be one or more AKM suites, which are common to the APs within the AP MLD, for the non-AP MLD to choose.

In some embodiments, the link-level capability indication information may include one or more of the following fields: Group Data Cipher Suite and Group Management Cipher Suite. The link-level capability indication information of the APs within the AP-MLD may be the same or different.

In some embodiments, if the APs within the AP MLD indicates different Group Data cipher suites, i.e., the link-level capability indication information of the APs within the AP MLD includes different Group Data Cipher Suites for the APs, the security capability indication information, which is included in the association request frame, of the non-AP MLD does not include a Group Data Cipher Suite or indicates a reserved value to indicate that the non-AP MLD supports a different Group Data Cipher Suite in each link.

In some embodiments, if the APs within the AP MLD indicates different Group Management Cipher Suites, i.e., the link-level capability indication information of the APs within the AP MLD includes different Group Management Cipher Suites for the APs, then the security capability indication information, which is included in the association request frame, of the non-AP MLD does not include a Group Management Cipher Suite or indicates a reserved value to indicate that the non-AP MLD supports a different Group Data Cipher Suite in each link.

In some embodiments, if the APs within the AP MLD indicates different Group Data Cipher Suites, then the non-AP MLD does not request to setup a link, for which the non-AP MLD does not support any Group Data cipher suite indicated by the APs within the AP MLD.

In some embodiments, if the APs within the AP MLD indicates different Group Management Cipher Suites, then the non-AP MLD does not request to setup a link, for which the non-AP MLD does not support any Group Management Cipher Suite indicated by the APs within the AP MLD.

In other words, under this option, the security capability indication information sent by any AP within the AP MLD comprises the MLD-level capability indication information common to the APs within the AP MLD and the link-level capability indication information corresponding to the AP.

Option 1.3

In some embodiments, the APs within the AP MLD may be configured to support the same or different MLD-level security capabilities and/or the same or different link-level security capabilities according to actual situations. In this case, a part of the MLD-level security capabilities of the APs within the AP MLD can be configured the same, and the other part of the MLD-level security capabilities of the APs within the AP MLD may be configured the same or different. The capability fields indicating the part of the MLD-level security capabilities in the MLD-level capability indication information transmitted by any AP within the AP MLD may be the same, and indicate not only corresponding MLD-level security capabilities of the AP but also the MLD-level security capabilities of the AP MLD.

The other part of the MLD-level security capabilities of the AP MLD are determined according to the other part of the MLD-level security capabilities of all the APs within AP MLD.

For example, if SPP A-MSDU and PBAC belongs to the other part of the MLD-level security capabilities of the APs within the AP MLD, some APs within the AP MLD are configured to support SPP A-MSDU and PBAC and the other APs within the AP MLD are configured to not support SPP A-MSDU but support PBAC, then it can be determined that the AP MLD does not support SPP A-MSDU and support PBAC.

In some embodiments, the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

In some embodiments, the link-level capability indication information comprises one or more of the following fields: Pairwise Cipher Suite and AKM Suite.

In some embodiments, in the security capability indication information of the non-AP MLD and the security capability indication information of any AP within the AP MLD, the following fields may be reserved: No Pairwise, Joint Multi-band RSNA, and OCVC.

In other words, under this option, the security capability indication information sent by any AP within the AP MLD comprises the MLD-level capability indication information common to the APs within the AP MLD and the link-level capability indication information corresponding to the AP.

It should be appreciated that under options 1.1-1.3, if the MLD-level capability indication information sent by all the plurality of APs within the AP MLD indicates that a security capability is supported, the security capability is supported by the AP MLD; if the MLD-level capability indication information sent by any AP within the AP MLD indicates that a security capability is not supported, the security capability is not supported by the AP MLD.

Option 2

In some embodiments, to improve communication efficiency between the AP MLD and the non-AP MLD, a MLD RSNE and a MLD RSNXE are defined to act as an information container for the MLD-level capability indication information of the AP MLD. Any AP within the AP MLD may transmit the MLD-level capability indication information common to the APs within the AP MLD by one MLD RSNE and one MLD RSNXE, and may also include the MLD RSNE and the MLD RSNXE in the beacons or the probe response frame.

In some embodiments, the MLD-level capability indication information may include one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

In some embodiments, the MLD-level capability indication information transmitted by the AP comprises one or more Pairwise Cipher Suites for the non-AP MLD to choose. In some embodiments, the MLD-level capability indication information transmitted by the AP comprises one or more AKM Suites for the non-AP MLD to choose.

The link-level capability indication information may include one or more of the following fields: Group Data Cipher Suite and Group Management Cipher Suite.

In the case that any of options 1 and 2 is implemented, when the method 600 is performed by each AP within the AP MLD, as the MLD-level capability indication information is transmitted by respective APs within the AP MLD, the security capabilities of the AP MLD can be definitely indicated to the non-AP MLD, and the inter-operation issues between the AP MLD and the non-AP MLD can be avoided.

In some embodiments, the non-AP MLD may similarly contain the MLD-level capability indication information common to the non-AP STAs within the non-AP MLD and the link-level capability indication information corresponding to respective ones of the non-AP STAs within the non-AP MLD in one RSNE and one RSNXE.

It should be appreciated that the association request frame from the non-AP MLD may be transmitted by any STA within the non-AP MLD and include the security capability indication information of all the non-AP STAs within the non-AP MLD. In some embodiments, any STA within the non-AP MLD may contain the security capability indication information of the non-AP MLD in one RSNE and one RSNXE or in one MLD RSNE and one MLD RSNXE.

It should be appreciated that when two peer MLDs communicates with each other, the communication process between them is similar as that described in conjunction with FIG. 6, the security capabilities of the STAs within the two peer MLDs may be similarly configured as above, and the security capability indication information can be determined and transmitted similarly as described above. For brevity, the communication process between the two peer MLDs and the processing of configuring the security capabilities of the STAs within the two peer MLDs, determining and transmitting the security capability indication information of the STAs within the two peer MLD are omitted.

FIG. 7 shows a functional diagram of an exemplary communication station 700, in accordance with one or more example embodiments of the disclosure. In one embodiment, FIG. 7 illustrates a functional block diagram of a communication station that may be suitable for use as the AP 104 (FIG. 1) or the user device 102 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for transmitting and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an liquid crystal display (LCD) screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine ZZ00 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a multi-link parameters and capability indication device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the multi-link parameters and capability indication device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The multi-link parameters and capability indication device 819 may carry out or perform any of the operations and processes (e.g., process XY00) described and shown above.

It is understood that the above are only a subset of what the multi-link parameters and capability indication device 819 may be configured to perform and that other functions included throughout this disclosure may also be performed by the multi-link parameters and capability indication device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
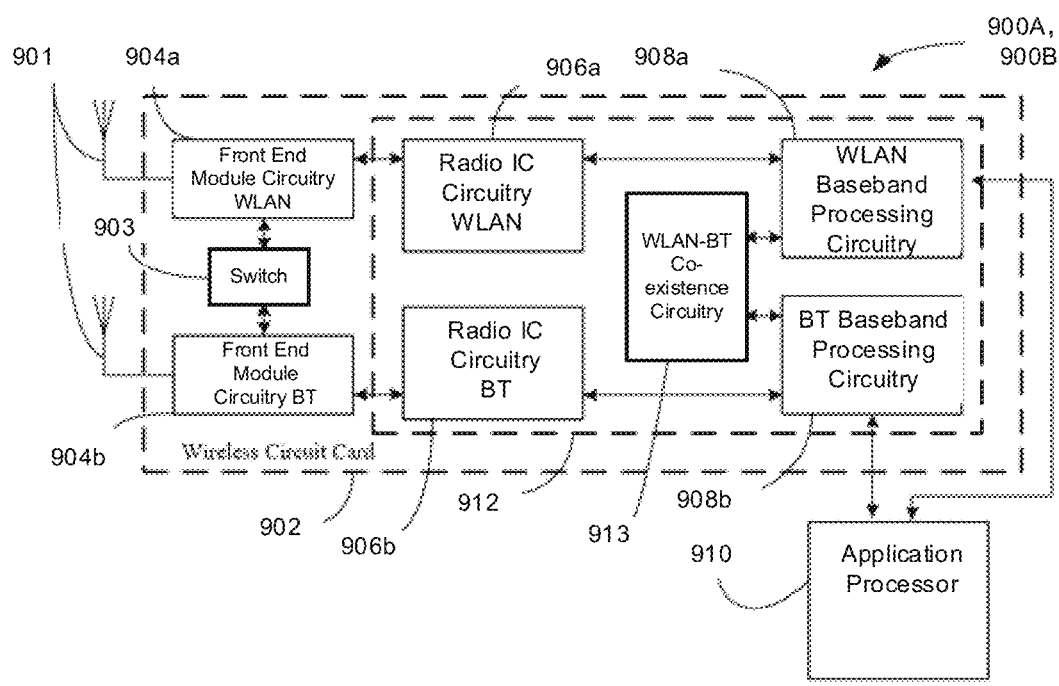
FIG. 9 is a block diagram of a radio architecture 900A, 900B in accordance with some embodiments that may be implemented in any one of APs 104 and/or the user devices 102 of FIG. 1.

FIG. 9 is a block diagram of a radio architecture 900A, 900B in accordance with some embodiments that may be implemented in any one of APs 104 and/or the user devices 102 of FIG. 1. Radio architecture 900A, 900B may include radio front-end module (FEM) circuitry 904*a-b*, radio IC circuitry 906*a-b* and baseband processing circuitry 908*a-b*. Radio architecture 900A, 900B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904*a-b* may include a WLAN or Wi-Fi FEM circuitry 904*a* and a Bluetooth (BT) FEM circuitry 904*b*. The WLAN FEM circuitry 904*a* may include a receive signal path comprising circuitry configured to operate on WLAN RF signals received from one or more antennas 901, to amplify the received signals and to provide the amplified versions of the received signals to the WLAN radio IC circuitry 906*a* for further processing. The BT FEM circuitry 904*b* may include a receive signal path which may include circuitry configured to operate on BT RF signals received from one or more antennas 901, to amplify the received signals and to provide the amplified versions of the received signals to the BT radio IC circuitry 906*b* for further processing. FEM circuitry 904*a* may also include a transmit signal path which may include circuitry configured to amplify WLAN signals provided by the radio IC circuitry 906*a* for wireless transmission by one or more of the antennas 901. In addition, FEM circuitry 904*b* may also include a transmit signal path which may include circuitry configured to amplify BT signals provided by the radio IC circuitry 906*b* for wireless transmission by the one or more antennas. In the embodiment of FIG. 9, although FEM 904*a* and FEM 904*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906*a-b* as shown may include WLAN radio IC circuitry 906*a* and BT radio IC circuitry 906*b*. The WLAN radio IC circuitry 906*a* may include a receive signal path which may include circuitry to down-convert WLAN RF signals received from the FEM circuitry 904*a* and provide baseband signals to WLAN baseband processing circuitry 908*a*. BT radio IC circuitry 906*b* may in turn include a receive signal path which may include circuitry to down-convert BT RF signals received from the FEM circuitry 904*b* and provide baseband signals to BT baseband processing circuitry 908*b*. WLAN radio IC circuitry 906*a* may also include a transmit signal path which may include circuitry to up-convert WLAN baseband signals provided by the WLAN baseband processing circuitry 908*a* and provide WLAN RF output signals to the FEM circuitry 904*a* for subsequent wireless transmission by the one or more antennas 901. BT radio IC circuitry 906*b* may also include a transmit signal path which may include circuitry to up-convert BT baseband signals provided by the BT baseband processing circuitry 908*b* and provide BT RF output signals to the FEM circuitry 904*b* for subsequent wireless transmission by the one or more antennas 901. In the embodiment of FIG. 9, although radio IC circuitries 906*a* and 906*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908*a-b* may include a WLAN baseband processing circuitry 908*a* and a BT baseband processing circuitry 908*b*. The WLAN baseband processing circuitry 908*a* may include a memory, such as, for example, a set of RAM arrays in a Fast Fourier Transform or Inverse Fast Fourier Transform block (not shown) of the WLAN baseband processing circuitry 908*a*. Each of the WLAN baseband circuitry 908*a* and the BT baseband circuitry 908*b* may further include one or more processors and control logic to process the signals received from the corresponding WLAN or BT receive signal path of the radio IC circuitry 906*a-b*, and to also generate corresponding WLAN or BT baseband signals for the transmit signal path of the radio IC circuitry 906*a-b*. Each of the baseband processing circuitries 908*a* and 908*b* may further include physical layer (PHY) and medium access control layer (MAC) circuitry, and may further interface with a device for generation and processing of the baseband signals and for controlling operations of the radio IC circuitry 906*a-b*.

Referring still to FIG. 9, according to the shown embodiment, WLAN-BT coexistence circuitry 913 may include logic providing an interface between the WLAN baseband circuitry 908*a* and the BT baseband circuitry 908*b* to enable use cases requiring WLAN and BT coexistence. In addition, a switch 903 may be provided between the WLAN FEM circuitry 904*a* and the BT FEM circuitry 904*b* to allow switching between the WLAN and BT radios according to application needs. In addition, although the antennas 901 are depicted as being respectively connected to the WLAN FEM circuitry 904*a* and the BT FEM circuitry 904*b*, embodiments include within their scope the sharing of one or more antennas as between the WLAN and BT FEMs, or the provision of more than one antenna connected to each of FEM 904*a* or 904*b*.

In some embodiments, the front-end module circuitry 904*a-b*, the radio IC circuitry 906*a-b*, and baseband processing circuitry 908*a-b* may be provided on a single radio card, such as wireless radio card 9. In some other embodiments, the one or more antennas 901, the FEM circuitry 904*a-b* and the radio IC circuitry 906*a-b* may be provided on a single radio card. In some other embodiments, the radio IC circuitry 906*a-b* and the baseband processing circuitry 908*a-b* may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 900A, 900B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 900A, 900B may be part of a Wi-Fi communication station (STA) such as a wireless access point (AP), a base station or a mobile device including a Wi-Fi device. In some of these embodiments, radio architecture 900A, 900B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 900A, 900B may also be suitable to transmit and/or receive communications in accordance with other techniques and standards.

In some embodiments, the radio architecture 900A, 900B may be configured for high-efficiency Wi-Fi (HEW) communications in accordance with the IEEE 802.11ax standard. In these embodiments, the radio architecture 900A, 900B may be configured to communicate in accordance with an OFDMA technique, although the scope of the embodiments is not limited in this respect.

In some other embodiments, the radio architecture 900A, 900B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 900A, 900B may include other radio cards, such as a cellular radio card configured for cellular (e.g., 5GPP such as LTE, LTE-Advanced or 7G communications).

In some IEEE 802.11 embodiments, the radio architecture 900A, 900B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
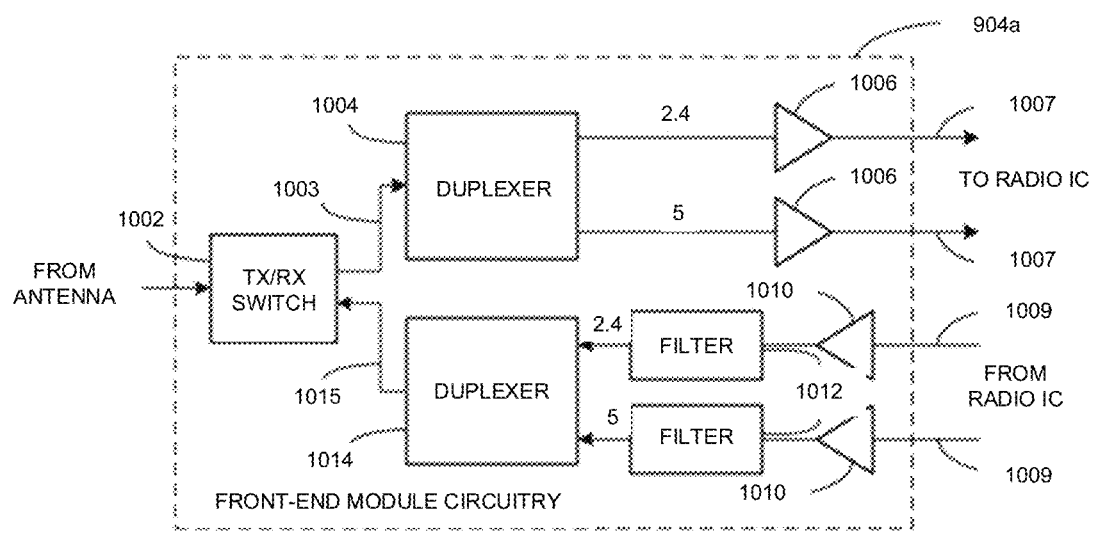
FIG. 10 illustrates WLAN FEM circuitry 904a in accordance with some embodiments.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path. The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

Figure 11:
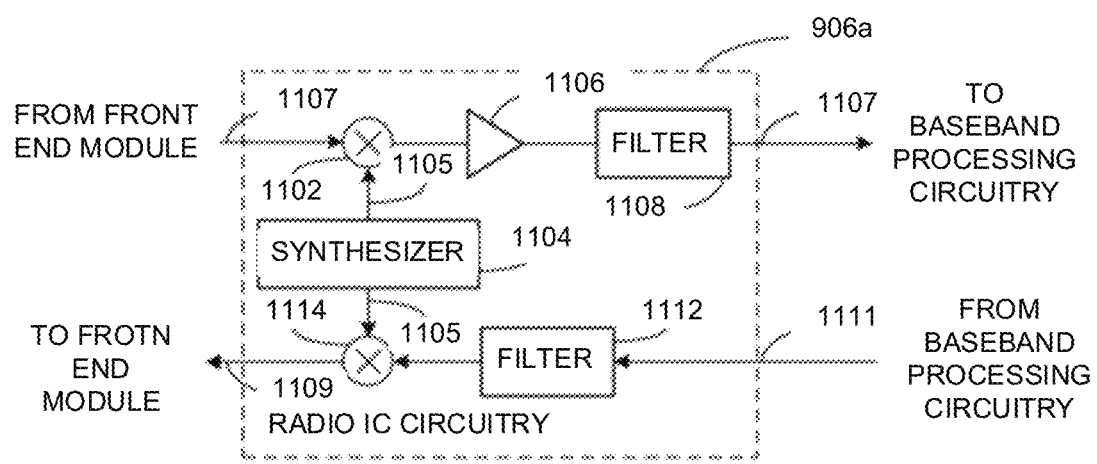
FIG. 11 illustrates radio IC circuitry 906a in accordance with some embodiments.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable. Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908a-b (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904a-b. The baseband signals 1111 may be provided by the baseband processing circuitry 908a-b and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example security signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
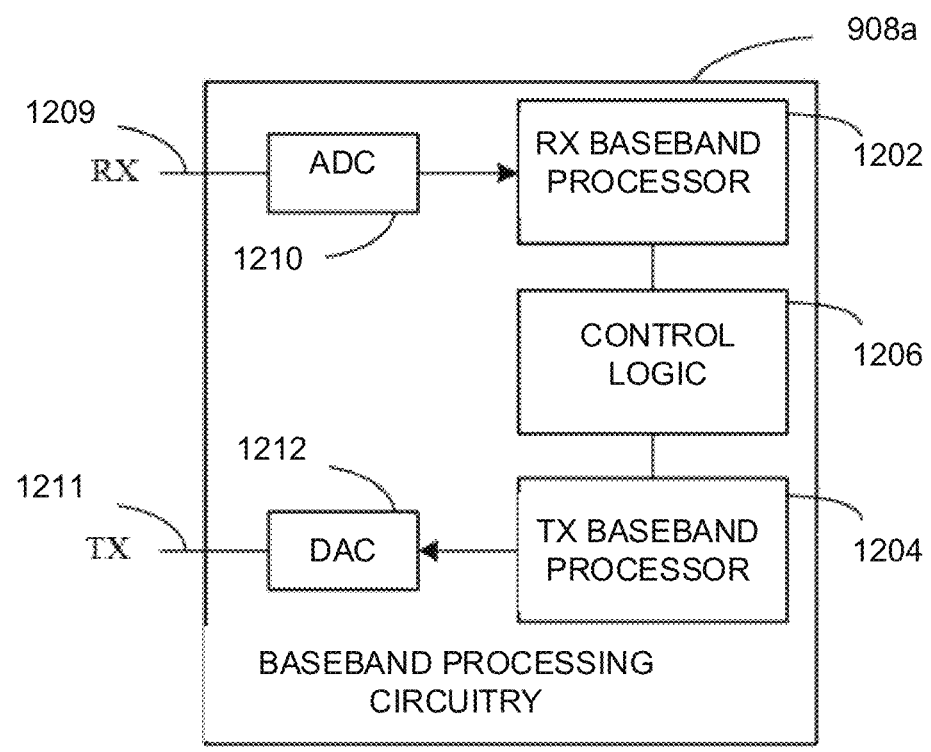
FIG. 12 illustrates a functional block diagram of baseband processing circuitry 908a in accordance with some embodiments.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 900A, 900B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes an access point multi-link device (AP MLD) comprising a plurality of APs, each of which comprises: a wireless medium; and processor circuitry coupled to the wireless medium and configured to: transmit security capability indication information via the wireless medium; receive an association request frame from a non-AP MLD via the wireless medium, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs; determine whether the security capability indication information of any of the plurality of non-AP STAs matches with the security capability indication information of the AP; and if the security capability indication information of one of the plurality of non-AP STAs matches with the security capability information of the AP, transmit an association response frame to the non-AP MLD via the wireless medium, wherein the security capability indication information transmitted by the AP comprises MLD-level capability indication information common to the plurality of APs and link-level capability indication information corresponding to the AP.

Example 2 includes the AP MLD of Example 1, wherein the link-level capability indication information of the plurality of APs is the same or different.

Example 3 includes the AP MLD of Example 1, wherein the security capability indication information transmitted by the AP is contained in a robust security network element (RSNE) and a robust security network extension element (RSNXE).

Example 4 includes the AP MLD of Example 3, wherein the MLD-level capability indication information comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

Example 5 includes the AP MLD of Example 4, wherein the MLD-level capability indication information comprises one or more Pairwise Cipher Suites for the non-AP MLD to choose.

Example 6 includes the AP MLD of Example 4, wherein the MLD-level capability indication information comprises one or more AKM Suites for the non-AP MLD to choose.

Example 7 includes the AP MLD of Example 4, wherein the MLD-level capability indication information comprises one or more Pairwise Cipher Suites, which are common to the plurality of APs, for the non-AP MLD to choose.

Example 8 includes the AP MLD of Example 4, wherein the MLD-level capability indication information comprises one or more AKM Suites, which are common to the plurality of APs, for the non-AP MLD to choose.

Example 9 includes the AP MLD of Example 4, wherein the link-level capability indication information comprises one or more of the following fields: Group Data Cipher Suite and Group Management Cipher Suite.

Example 10 includes the AP MLD of Example 3, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 11 includes the AP MLD of Example 10, wherein the link-level capability indication information comprises one or more of the following fields: Pairwise Cipher Suite and AKM Suite.

Example 12 includes a non-access point multi-link device (non-AP MLD) comprising a plurality of non-AP stations (non-AP STAs), each of which comprises: a wireless medium; and processor circuitry coupled to the wireless medium and configured to: transmit an association request frame to a AP MLD via the wireless medium, wherein the AP MLD comprises a plurality of Access Points (APs), the association request frame is transmitted by the non-AP MLD based on security capability indication information from the plurality of APs and comprises security capability indication information of the non-AP MLD, and the security capability indication information of the non-AP MLD comprises MLD-level capability indication information common to the plurality of non-AP STAs and link-level capability indication information corresponding to respective ones of the plurality of non-AP STAs; and receive an association response frame from the AP MLD via the wireless medium, wherein the association response frame is transmitted by the AP MLD if the security capability indication information of the non-AP STA matches with the security capability information of one of the plurality of APs.

Example 13 includes the non-AP MLD of Example 12, wherein the security capability indication information of the non-AP MLD is contained in a robust security network element (RSNE) and a robust security network extension element (RSNXE) or in a MLD RSNE and a RLD RSNXE.

Example 14 includes the non-AP MLD of Example 13, wherein the MLD-level capability indication information of the non-AP MLD comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 15 includes the non-AP MLD of Example 13, wherein the link-level capability indication information of the non-AP MLD comprises one or more of the following fields: Group Data Cipher Suite and Group Management Cipher Suite.

Example 16 includes the non-AP MLD of Example 15, wherein if the security capability indication information of the plurality of APs comprises different Group Data Cipher Suites for the plurality of APs, the security capability indication information of the non-AP MLD does not comprise a Group Data Cipher Suite or comprises a reserved value to indicate that the non-AP MLD supports a different Group Data Cipher Suite in each link.

Example 17 includes the non-AP MLD of Example 15, wherein if the security capability indication information of the plurality of APs comprises different Group Management Cipher Suites for the plurality of APs, the security capability indication information of the non-AP MLD does not comprise a Group Management Cipher Suite or comprises a reserved value to indicate that the non-AP MLD supports a different Group Management Cipher Suite field in each link.

Example 18 includes a multi-link device (MLD) for communication, comprising a plurality of stations (STAs), each of which comprises: a wireless medium; and processor circuitry coupled to the wireless medium interface and configured to: transmit an association request frame to second MLD for communication via the wireless medium, wherein the second MLD for communication is a peer device of the MLD for communication and comprises a second plurality of stations (STAs), the association request frame comprises security capability indication information of the MLD for communication, and the security capability indication information of the MLD for communication comprises MLD-level capability indication information common to the plurality of STAs and link-level capability indication information corresponding to the STA; and receive an association response frame from the second MLD for communication via the wireless interface, wherein the association response frame is transmitted by the second MLD for communication if the security capability indication information of the STA matches with the security capability information of one of the second plurality of STAs.

Example 19 includes the MLD for communication of Example 18, wherein the security capability indication information of the MLD for communication is contained in a robust security network element (RSNE) and a robust security network extension element (RSNXE).

Example 20 includes the MLD for communication of Example 18, wherein the MLD-level capability indication information of the MLD for communication comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 21 includes the MLD for communication of Example 18, wherein the link-level capability indication information of the MLD for communication comprises one or more of the following fields: Group Data Cipher Suite and Group Management Cipher Suite.

Example 22 includes the MLD for communication of Example 18, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 23 includes the MLD for communication of Example 18, wherein the link-level capability indication information comprises one or more of the following fields: Pairwise Cipher Suite and AKM Suite.

Example 24 includes the MLD for communication of Example 20, wherein the MLD-level capability indication information comprises one or more Pairwise Cipher Suites for the second MLD for communication to choose.

Example 25 includes the MLD for communication of Example 20, wherein the MLD-level capability indication information comprises one or more AKM Suites for the second MLD for communication to choose.

Example 26 includes the MLD for communication of Example claim 20, wherein the MLD-level capability indication information comprises one or more Pairwise Cipher Suites, which are common to the plurality of STA, for the second MLD for communication to choose.

Example 27 includes the MLD for communication of Example 20, wherein the MLD-level capability indication information comprises one or more AKM Suites, which are common to the plurality of STAs, for the second MLD for communication to choose.

Example 28 includes a method performed in an access point multi-link device (AP MLD), wherein the AP MLD comprises a plurality of Access Points (APs) and the method is performed by each of the plurality of APs, the method comprising: transmitting security capability indication information via a wireless medium; receiving an association request frame from a non-AP MLD via the wireless medium, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs; determining whether the security capability indication information of any of the plurality of non-AP STAs matches with the security capability indication information of the AP; and if the security capability indication information of one of the plurality of non-STAs matches with the security capability information of the AP, transmitting an association response frame to the non-AP MLD via the wireless medium, wherein the security capability indication information transmitted by the AP comprises MLD-level capability indication information common to the plurality of APs and link-level capability indication information corresponding to the AP.

Example 29 includes the method of Example 28, wherein the link-level capability indication information of the plurality of APs is the same or different.

Example 30 includes the method of Example 28, wherein the security capability indication information transmitted by the AP is contained in a robust security network element (RSNE) and a robust security network extension element (RSNXE).

Example 31 includes the method of Example 30, wherein the MLD-level capability indication information comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

Example 32 includes the method of Example 31, wherein the MLD-level capability indication information comprises one or more Pairwise Cipher Suites for the non-AP MLD to choose.

Example 33 includes the method of Example 31, wherein the MLD-level capability indication information comprises one or more AKM Suites for the non-AP MLD to choose.

Example 34 includes the method of Example 31, wherein the MLD-level capability indication information comprises one or more Pairwise Cipher Suites, which are common to the plurality of APs, for the non-AP MLD to choose.

Example 35 includes the method of Example 31, wherein the MLD-level capability indication information comprises one or more AKM Suites, which are common to the plurality of APs, for the non-AP MLD to choose.

Example 36 includes the method of Example 31, wherein the link-level capability indication information comprises one or more of the following fields: Group Data Cipher Suite and Group Management Cipher Suite.

Example 37 includes the method of Example 30, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 38 includes the method of Example 37, wherein the link-level capability indication information comprises one or more of the following fields: Pairwise Cipher Suite and AKM Suite.

Example 39 includes method performed in a non-access point multi-link device (non-AP MLD), wherein the non-AP MLD comprises a plurality of non-AP stations (non-AP STAs) and the method is performed by each of the plurality of non-AP STAs, the method comprising: transmitting an association request frame to an AP MLD via wireless medium, wherein the AP MLD comprises a plurality of APs, the association request frame is transmitted by the non-AP MLD based on security capability indication information from the plurality of APs and comprises security capability indication information of the non-AP MLD, and the security capability indication information of the non-AP MLD comprises MLD-level capability indication information common to the plurality of non-AP STAs and link-level capability indication information corresponding to respective ones of the plurality of non-AP STAs; and receiving an association response frame from the AP MLD via the wireless medium, wherein the association response frame is transmitted by the AP MLD if the security capability indication information of the non-STA matches with the security capability information of one of the plurality of APs.

Example 40 includes the method of Example 41, wherein the security capability indication information of the non-AP MLD is contained in a robust security network element (RSNE) and a robust security network extension element (RSNXE) or in a MLD RSNE and a MLD RSNXE.

Example 41 includes the method of Example 39, wherein the MLD-level capability indication information of the non-AP MLD comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 42 includes the method of Example 41, wherein the link-level capability indication information of the non-AP MLD comprises one or more of the following fields: Group Data Cipher Suite and Group Management Cipher Suite.

Example 43 includes the method of Example 42, wherein if the security capability indication information of the plurality of APs comprises different Group Data Cipher Suites for the plurality of APs, the security capability indication information of the non-AP MLD does not comprise a Group Data Cipher Suite or comprises a reserved value to indicate that the non-AP MLD supports a different Group Data Cipher Suite in each link.

Example 44 includes the method of Example 42, wherein if the security capability indication information of the plurality of APs comprises different Group Management Cipher Suites for the plurality of APs, the security capability indication information of the non-AP MLD does not comprise a Group Management Cipher Suite or comprises a reserved value to indicate that the non-AP MLD supports a different Group Management Cipher Suite field in each link.

Example 45 includes a method performed in a multi-link device (MLD) for communication, wherein the MLD for communication comprises a plurality of stations (STAs) and the method is performed by each of the plurality of STAs, the method comprising: transmitting an association request frame to a second MLD for communication via a wireless medium, wherein the second MLD for communication is a peer device of the MLD for communication and comprises a second plurality of stations (STAs), the association request frame comprises security capability indication information of the MLD for communication, and the security capability indication information of the MLD for communication comprises MLD-level capability indication information common to the plurality of STAs and link-level capability indication information corresponding to the STA; and receiving an association response frame from the second MLD for communication via the wireless interface, wherein the association response frame is transmitted by the second MLD for communication if the security capability indication information of the STA matches with the security capability information of one of the second plurality of STAs.

Example 46 includes the method of Example 45, wherein the security capability indication information of the MLD for communication is contained in a robust security network element (RSNE) and a robust security network extension element (RSNXE).

Example 47 includes the method of Example 46, wherein the MLD-level capability indication information of the MLD for communication comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 48 includes the method of Example 46, wherein the link-level capability indication information of the MLD for communication comprises one or more of the following fields: Group Data Cipher Suite and Group Management Cipher Suite.

Example 49 includes the method of Example 46, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 50 includes the method of Example 46, wherein the link-level capability indication information comprises one or more of the following fields: Pairwise Cipher Suite and AKM Suite.

Example 51 includes the method of Example 49, wherein the MLD-level capability indication information comprises one or more Pairwise Cipher Suites for the second MLD for communication to choose.

Example 52 includes the method of Example 49, wherein when the MLD-level capability indication information comprises one or more AKM Suites for the second MLD for communication to choose.

Example 53 includes the method of Example 49, wherein the MLD-level capability indication information comprises one or more Pairwise Cipher Suites, which are common to the plurality of STA, for the second MLD for communication to choose.

Example 54 includes the method of Example 49, wherein the MLD-level capability indication information comprises one or more AKM Suites, which are common to the plurality of STAs, for the second MLD for communication to choose.

Example 55 includes an access point multi-link device (AP MLD) comprising a plurality of APs, each of which comprises: means for transmitting security capability indication information via a wireless medium; means for receiving an association request frame from a non-AP MLD via the wireless medium, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs; means for determining whether the security capability indication information of any of the plurality of non-AP STAs matches with the security capability indication information of the AP; and means for if the security capability indication information of one of the plurality of non-AP STAs matches with the security capability information of the AP, transmitting an association response frame to the non-AP MLD via the wireless medium, wherein the security capability indication information transmitted by the AP comprises MLD-level capability indication information common to the plurality of APs and link-level capability indication information corresponding to the AP.

Example 56 includes the AP MLD of Example 55, wherein the link-level capability indication information of the plurality of APs is the same or different.

Example 57 includes the AP MLD of Example 55, wherein the security capability indication information transmitted by the AP is contained in a robust security network element (RSNE) and a robust security network extension element (RSNXE).

Example 58 includes the AP MLD of Example 57, wherein the MLD-level capability indication information comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

Example 59 includes the AP MLD of Example 58, wherein when the security capability indication information transmitted by the AP comprises the link-level capability indication information corresponding to respective ones of the plurality of APs, the MLD-level capability indication information comprises one or more Pairwise Cipher Suites for the non-AP MLD to choose.

Example 60 includes the AP MLD of Example 58, wherein the MLD-level capability indication information comprises one or more AKM Suites for the non-AP MLD to choose.

Example 61 includes the AP MLD of Example 58, wherein the MLD-level capability indication information comprises one or more Pairwise Cipher Suites, which are common to the plurality of APs, for the non-AP MLD to choose.

Example 62 includes the AP MLD of Example 58, wherein the MLD-level capability indication information comprises one or more AKM Suites, which are common to the plurality of APs, for the non-AP MLD to choose.

Example 63 includes the AP MLD of Example 58, wherein the link-level capability indication information comprises one or more of the following fields: Group Data Cipher Suite and Group Management Cipher Suite.

Example 64 includes the AP MLD of Example 57, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 65 includes the AP MLD of Example 64, wherein the link-level capability indication information comprises one or more of the following fields: Pairwise Cipher Suite and AKM Suite.

Example 66 includes a non-access point multi-link device (non-AP MLD) comprising a plurality of non-AP stations (non-AP STAs), each of which comprises: means for transmitting an association request frame to a AP MLD via a wireless medium, wherein the AP MLD comprises a plurality of Access Points (APs), the association request frame is transmitted by the non-AP MLD based on security capability indication information from the plurality of APs and comprises security capability indication information of the non-AP MLD, and the security capability indication information of the non-AP MLD comprises MLD-level capability indication information common to the plurality of non-AP STAs and link-level capability indication information corresponding to respective ones of the plurality of non-AP STAs; and means for receiving an association response frame from the AP MLD via the wireless medium, wherein the association response frame is transmitted by the AP MLD if the security capability indication information of the non-AP STA matches with the security capability information of one of the plurality of APs.

Example 67 includes the non-AP MLD of Example 66, wherein the security capability indication information of the non-AP MLD is contained in a robust security network element (RSNE) and a robust security network extension element (RSNXE) or in a MLD RSNE and a MLD RSNXE.

Example 68 includes the non-AP MLD of Example 67, wherein the MLD-level capability indication information of the non-AP MLD comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 69 includes the non-AP MLD of Example 67, wherein the link-level capability indication information of the non-AP MLD comprises one or more of the following fields: Group Data Cipher Suite and Group Management Cipher Suite.

Example 70 includes the non-AP MLD of Example 69, wherein if the security capability indication information of the plurality of APs comprises different Group Data Cipher Suites for the plurality of APs, the security capability indication information of the non-AP MLD does not comprise a Group Data Cipher Suite or comprises a reserved value to indicate that the non-AP MLD supports a different Group Data Cipher Suite in each link.

Example 71 includes the non-AP MLD of Example 69, wherein if the security capability indication information of the plurality of APs comprises different Group Management Cipher Suites for the plurality of APs, the security capability indication information of the non-AP MLD does not comprise a Group Management Cipher Suite or comprises a reserved value to indicate that the non-AP MLD supports a different Group Management Cipher Suite field in each link.

Example 72 includes a multi-link device (MLD) for communication, comprising a plurality of stations (STAs), each of which comprises: means for transmitting an association request frame to second MLD for communication via a wireless medium, wherein the second MLD for communication is a peer device of the MLD for communication and comprises a second plurality of stations (STAs), the association request frame comprises security capability indication information of the MLD for communication, and the security capability indication information of the MLD for communication comprises MLD-level capability indication information common to the plurality of STAs and link-level capability indication information corresponding to the STA; and means for receiving an association response frame from the second MLD for communication via the wireless interface, wherein the association response frame is transmitted by the second MLD for communication if the security capability indication information of the STA matches with the security capability information of one of the second plurality of STAs.

Example 73 includes the MLD for communication of Example 72, wherein the security capability indication information of the MLD for communication is contained in a robust security network element (RSNE) and a robust security network extension element (RSNXE).

Example 74 includes the MLD for communication of Example 73, wherein the MLD-level capability indication information of the MLD for communication comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

Example 75 includes the MLD for communication of Example 73, wherein the link-level capability indication information of the MLD for communication comprises one or more of the following fields: Group Data Cipher Suite and Group Management Cipher Suite.

Example 76 includes the MLD for communication of Example 73, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

Example 77 includes the MLD for communication of Example 73, wherein the link-level capability indication information comprises one or more of the following fields: Pairwise Cipher Suite and AKM Suite.

Example 78 includes the MLD for communication of Example 74, wherein the MLD-level capability indication information comprises one or more Pairwise Cipher Suites for the second MLD for communication to choose.

Example 79 includes the MLD for communication of Example 74, wherein the MLD-level capability indication information comprises one or more AKM Suites for the second MLD for communication to choose.

Example 80 includes the MLD for communication of Example 74, wherein the MLD-level capability indication information comprises one or more Pairwise Cipher Suites, which are common to the plurality of STA, for the second MLD for communication to choose.

Example 81 includes the MLD for communication of Example 74, wherein the MLD-level capability indication information comprises one or more AKM Suites, which are common to the plurality of STAs, for the second MLD for communication to choose.

Example 82 includes a computer-readable storage medium, comprising a computer program, when executed by a processor, causes the processor to implement any of Examples 27-54.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof

What is claimed is:

1. An access point multi-link device (AP MLD) comprising a plurality of APs, each of which comprises:
a wireless medium; and
processor circuitry coupled to the wireless medium and configured to:
transmit security capability indication information via the wireless medium;
receive an association request frame from a non-AP MLD via the wireless, medium wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs;
determine whether the security capability indication information of any of the plurality of non-AP STAs matches with the security capability indication information of the AP; and
if the security capability indication information of one of the plurality of non-AP STAs matches with the security capability information of the AP, transmit an association response frame to the non-AP MLD via the wireless medium, wherein
the security capability indication information transmitted by the AP comprises MLD-level capability indication information common to the plurality of APs and link-level capability indication information corresponding to the AP.

2. The AP MLD of claim 1, wherein the link-level capability indication information of the plurality of APs is the same or different.

3. The AP MLD of claim 1, wherein the security capability indication information transmitted by the AP is contained in a robust security network element (RSNE) and a robust security network extension element (RSNXE).

4. The AP MLD of claim 1, wherein the MLD-level capability indication information transmitted by the AP is contained in a MLD robust security network element (RSNE) and a MLD robust security network extension element (RSNXE).

5. The AP MLD of claim 4, wherein the MLD-level capability indication information comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

6. The AP MLD of claim 5, wherein the MLD-level capability indication information comprises one or more Pairwise Cipher Suites for the non-AP MLD to choose.

7. The AP MLD of claim 5, wherein the MLD-level capability indication information comprises one or more AKM Suites for the non-AP MLD to choose.

8. The AP MLD of claim 5, wherein the MLD-level capability indication information comprises one or more Pairwise Cipher Suites, which are common to the plurality of APs, for the non-AP MLD to choose.

9. The AP MLD of claim 5, wherein the MLD-level capability indication information comprises one or more AKM Suites, which are common to the plurality of APs, for the non-AP MLD to choose.

10. The AP MLD of claim 5, wherein the link-level capability indication information comprises one or more of the following fields: Group Data Cipher Suite and Group Management Cipher Suite.

11. The AP MLD of claim 3, wherein the MLD-level capability indication information comprises one of more of the following fields: Preauthentication, PTKSA replay counter, MFPR, MPFC, SPP A-MSDU capable, SPP A-MSDU Required, PBAC, Extended Key ID for Individually Addressed Frames, Group Data Cipher Suite, Group Management Cipher Suite, SAE-hash-to-element and Protected TWT Operations Support.

12. The AP MLD of claim 11, wherein the link-level capability indication information comprises one or more of the following fields: Pairwise Cipher Suite and AKM Suite.

13. The AP MLD of claim 3, wherein if the MLD-level capability indication information sent by all the plurality of APs within the AP MLD indicates that a security capability is supported, the security capability is supported by the AP MLD.

14. A non-access point multi-link device (non-AP MLD) comprising a plurality of non-AP stations (non-AP STAs), each of which comprises:
  a wireless medium; and
  processor circuitry coupled to the wireless medium and configured to:
    transmit an association request frame to a AP MLD via the wireless medium, wherein
      the AP MLD comprises a plurality of Access Points (APs),
      the association request frame is transmitted by the non-AP MLD based on security capability indication information from the plurality of APs and comprises security capability indication information of the non-AP MLD, and
      the security capability indication information of the non-AP MLD comprises MLD-level capability indication information common to the plurality of non-AP STAs and link-level capability indication information corresponding to respective ones of the plurality of non-AP STAs; and
    receive an association response frame from the AP MLD via the wireless medium, wherein the association response frame is transmitted by the AP MLD if the security capability indication information of the non-AP STA matches with the security capability information of one of the plurality of APs.

15. The non-AP MLD of claim 14, wherein the security capability indication information of the non-AP MLD is contained in a MLD robust security network element (RSNE) and a MLD robust security network extension element (RSNXE) or in a RSNE and a RSNXE.

16. The non-AP MLD of claim 15, wherein the MLD-level capability indication information of the non-AP MLD comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, and AKM Cipher Suite.

17. The non-AP MLD of claim 15, wherein the link-level capability indication information of the non-AP MLD comprises one or more of the following fields: Group Data Cipher Suite and Group Management Cipher Suite.

18. The non-AP MLD of claim 17, wherein if the security capability indication information from the plurality of APs comprises different Group Data Cipher Suites for the plurality of APs, the security capability indication information of the non-AP MLD does not comprise a Group Data Cipher Suite or comprises a reserved value to indicate that the non-AP MLD supports a different Group Data Cipher Suite in each link.

19. The non-AP MLD of claim 17, wherein if the security capability indication information of the plurality of APs comprises different Group Management Cipher Suites for the plurality of APs, the security capability indication information of the non-AP MLD does not comprise a Group Management Cipher Suite or comprises a reserved value to indicate that the non-AP MLD supports a different Group Management Cipher Suite field in each link.

20. A method performed in an access point multi-link device (AP MLD), wherein the AP MLD comprises a plurality of Access Points (APs) and the method is performed by each of the plurality of APs, the method comprising:
  transmitting security capability indication information via a wireless medium;
  receiving an association request frame from a non-AP MLD via the wireless medium, wherein the non-AP MLD comprises a plurality of non-AP stations (non-AP STAs) and the association request frame is transmitted by the non-AP MLD based on security capability indication information from the plurality of APs and comprises security capability indication information of the plurality of non-AP STAs;
  determining whether the security capability indication information of any of the plurality of non-AP STAs matches with the security capability indication information of the AP; and
  if the security capability indication information of one of the plurality of non-STAs matches with the security capability information of the AP, transmitting an association response frame to the non-AP MLD via the wireless medium, wherein
  the security capability indication information transmitted by the AP comprises MLD-level capability indication information common to the plurality of APs and link-level capability indication information corresponding to the AP.

21. The method of claim 20, wherein the link-level capability indication information of the plurality of APs is the same or different.

22. The method of claim 20, wherein the security capability indication information transmitted by the AP is contained in a robust security network element (RSNE) and a robust security network extension element (RSNXE).

23. The method of claim 20, wherein the MLD-level capability indication information transmitted by the AP is contained in a MLD robust security network element (RSNE) and a MLD robust security network extension element (RSNXE).

24. The method of claim 23, wherein the MLD-level capability indication information comprises one or more of the following fields: Preauthentication, PTKSA replay counter, MFPR, MPFC, SPP A-MSDU capable, SPP A-MSDU Required, PBAC, Extended Key ID for Individually Addressed Frames, SAE-hash-to-element, Protected TWT Operations Support, Pairwise Cipher Suite and AKM Suite.

25. The method of claim 24, wherein the MLD-level capability indication information comprises one or more Pairwise Cipher Suites for the non-AP MLD to choose.

* * * * *